United States Patent
Jordan et al.

(10) Patent No.: US 10,723,012 B1
(45) Date of Patent: Jul. 28, 2020

(54) SUPPORT APPARATUS UTILIZING COUNTERBALANCING MEANS

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 0 days.

(21) Appl. No.: 16/350,125

(22) Filed: Sep. 29, 2018

Related U.S. Application Data

(60) Provisional application No. 62/606,640, filed on Oct. 2, 2017.

(51) Int. Cl.
  *F16M 13/00* (2006.01)
  *B25H 1/00* (2006.01)
  *F16M 13/02* (2006.01)

(52) U.S. Cl.
  CPC ......... *B25H 1/0028* (2013.01); *B25H 1/0035* (2013.01); *F16M 13/022* (2013.01); *F16M 2200/044* (2013.01); *F16M 2200/063* (2013.01)

(58) Field of Classification Search
  CPC .................... F16M 11/08; F16M 1/00
  See application file for complete search history.

(56) References Cited

U.S. PATENT DOCUMENTS

| | | | |
|---|---|---|---|
| 8,777,172 B2 * | 7/2014 | Sapper | F16M 11/08 248/274.1 |
| 2006/0186281 A1 * | 8/2006 | Thiessen | B25H 1/0021 248/123.11 |
| 2016/0131880 A1 * | 5/2016 | Kamata | G02B 21/0012 348/79 |

* cited by examiner

Primary Examiner — Amy J. Sterling
(74) Attorney, Agent, or Firm — Michael E. McKee

(57) ABSTRACT

A support apparatus anchorable to a fixed structure for aiding in the support of a hand-operated tool during use includes an articulated arm unit including linkages which provide the arm unit with a distal end to which the tool can be secured and an opposite proximal end. The arm unit includes a counterbalancing spring so that movement of the distal end of the arm unit relative to the proximal end thereof is effected with relative ease. A mount associated with the proximal end of the arm unit is capable of being secured to a fixed structure for anchoring the support apparatus thereto. In addition, three pins are joined to and extend from the body of the mount so that when the proximal end of the arm unit is pivotally connected to any one of the three pins, the arm unit can be pivotally moved relative to the mount about any one axis of a spatial arrangement including three coordinate axes.

19 Claims, 6 Drawing Sheets

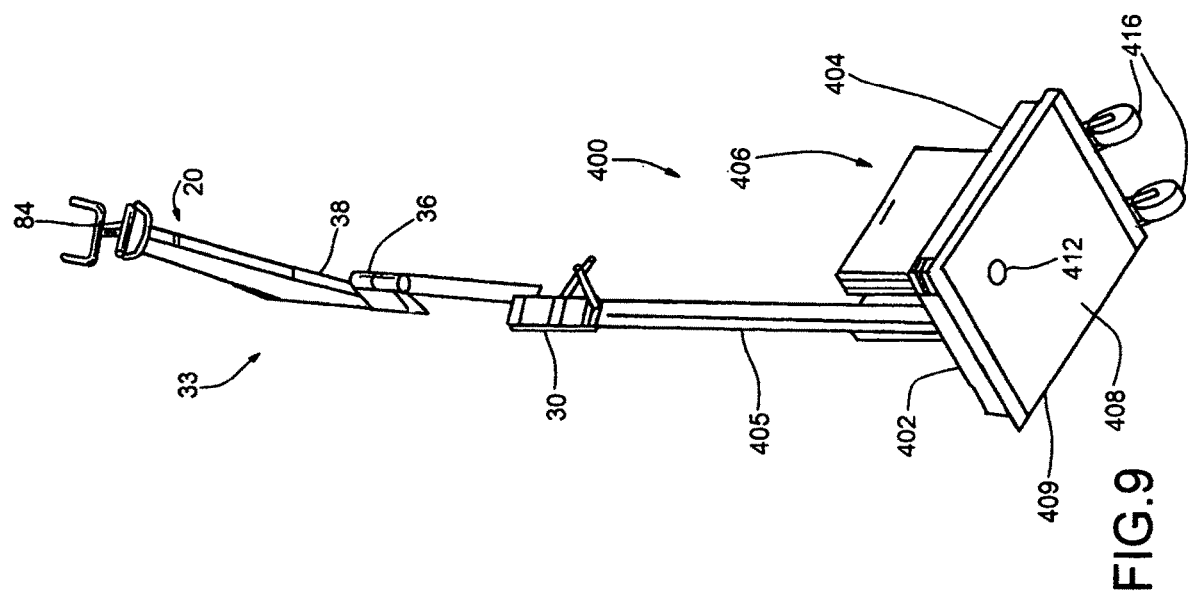
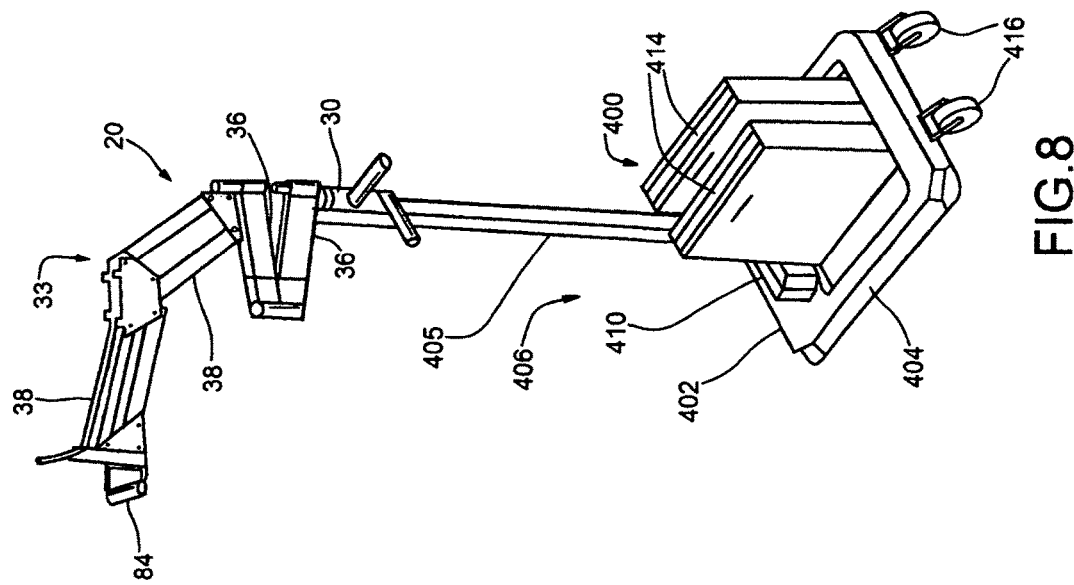

SUPPORT APPARATUS UTILIZING COUNTERBALANCING MEANS

The benefit of Provisional Application Ser. No. 62/606,640, filed Oct. 2, 2017 and entitled TOOL CRANE, is hereby claimed. The disclosure of this referenced provisional application is incorporated herein by reference.

BACKGROUND OF THE INVENTION

This invention relates generally to apparatus for aiding in the support of an item and relates, more particularly, to such apparatus which can be anchored to a fixed structure for aiding in the support of a tool, such as a hand-operated power tool, during use of the tool.

The class of support apparatus with which this invention is to be compared includes those used for supporting relatively heavy hand tools at construction sites. Such tools may include jacks, hammer drills, air hammers, impact wrenches and crimping tools which, if not partially supported by counterbalanced support apparatus, could quickly fatigue a user who uses the tool over an extended or uninterrupted period of time.

One such support apparatus of the aforedescribed class is shown and described in U.S. Pat. No. 7,325,777.

It would be desirable to provide a support apparatus of the aforedescribed class which improves upon such support apparatus of the prior art.

Accordingly, it is an object of the present invention to provide a new and improved support apparatus of the aforedescribed class which includes a novel mounting scheme enabling the apparatus to be rigidly supported from any of a number of fixed structures for use of the apparatus and the tool intended to be supported by the apparatus.

Another object of the present invention is to provide such a support apparatus which is relatively compact and capable of being readily moved between job sites.

Still another object of the present invention is to provide such a support apparatus having a distal end at which a tool is supported and which provides the supported tool with a relatively large degree of freedom of movement.

Yet another object of the present invention is to provide such a support apparatus having a tool-supporting head which is capable of biasing the tool into working relationship with a surface desired to be worked upon.

A further object of the present invention is to provide such a support apparatus which can be utilized with a portable stand to which the support apparatus can be anchored.

A still further object of the present invention is to provide such a support apparatus which is uncomplicated in structure, yet effective in operation.

SUMMARY OF THE INVENTION

This invention resides in a support apparatus anchorable to a fixed structure for aiding in the support of a hand-operated tool during use of the tool.

The support apparatus includes an articulated arm unit including a plurality of linkages which are pivotally connected to one another in a end-to-end arrangement so as to provide the articulated arm unit with a distal end to which a hand tool is connected for support thereby and an opposite proximal end wherein the arm unit includes counterbalancing means associated with at least one of the linkages thereof so that pivotal movement of the distal end of the arm unit relative to the proximal end thereof is effected with relative ease. In addition, a mount is associated with the proximal end of the arm unit and includes a body which is capable of being secured to a fixed structure for anchoring the support apparatus to the fixed structure. The mount further includes two pins which are joined to and extend from the body of the mount and which are oriented in a substantially normal relationship with one another. Moreover, the proximal end of the arm unit is capable of being pivotally joined to either of the two pins of the body of the mount so that upon anchoring the body of the mount to a fixed structure and by pivotally joining the proximal end of the articulated arm unit to one or the other of the two pins of the mount, the articulated arm unit is capable of being pivoted relative to the fixed structure about a first axis or a second axis wherein the first and second axes are arranged in a substantially normal relationship.

BRIEF DESCRIPTION OF THE DRAWINGS

FIG. 8 is a perspective view of one more support apparatus with which features of the invention are embodied shown anchored to a portable stand.

FIG. 9 is a perspective view of the one more support apparatus and support stand of FIG. 8 as seen from an alternative angle.

DETAILED DESCRIPTION OF AN ILLUSTRATIVE EMBODIMENT

Figure 1:
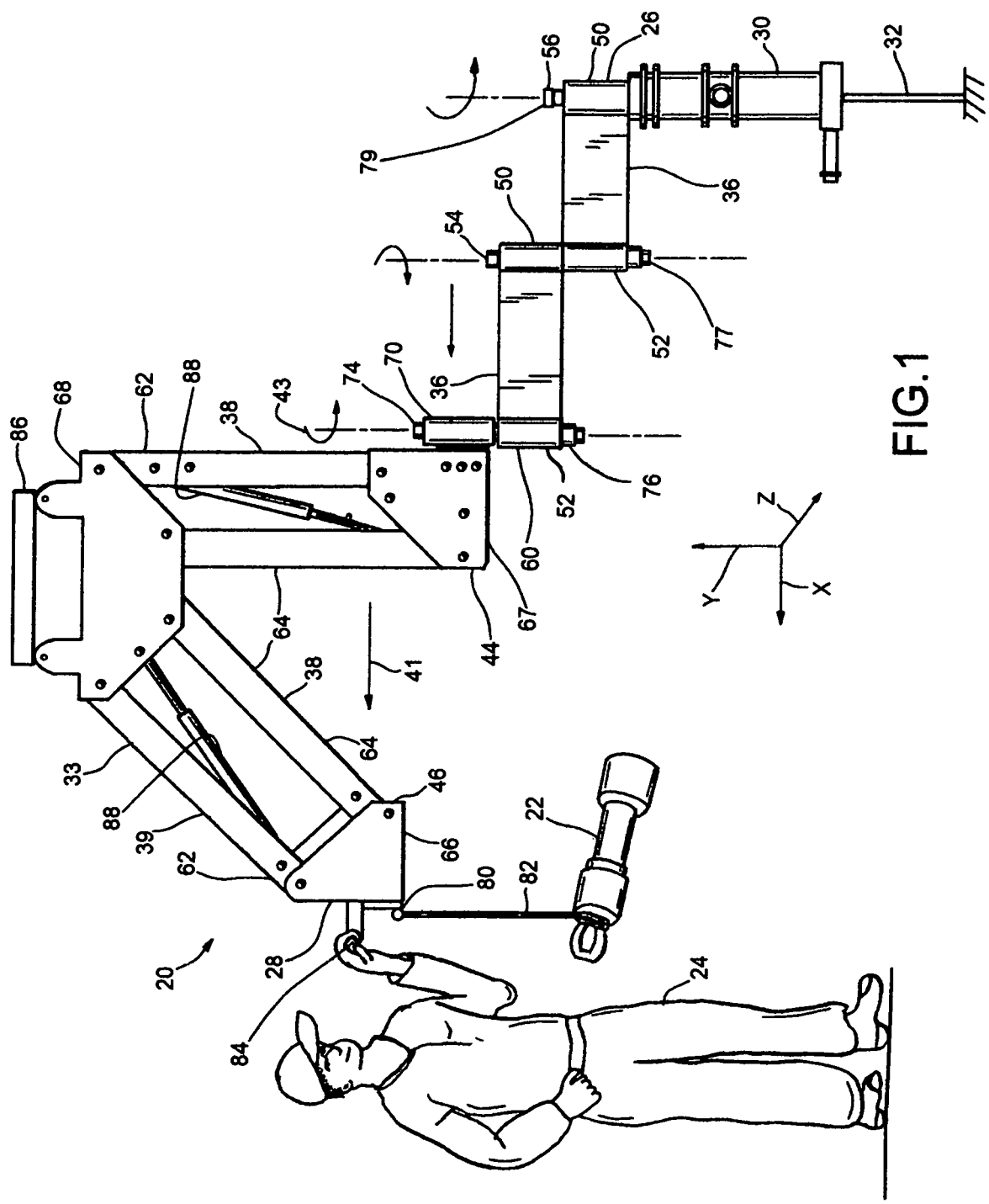
FIG. 1 is a perspective view of a support structure within which features of the present invention are embodied shown mounted upon a vertically-oriented stationary structure for supporting a portable hand-operated tool for use and wherein the arrangement of linkages of the apparatus are positioned in one condition.
Figure 2:
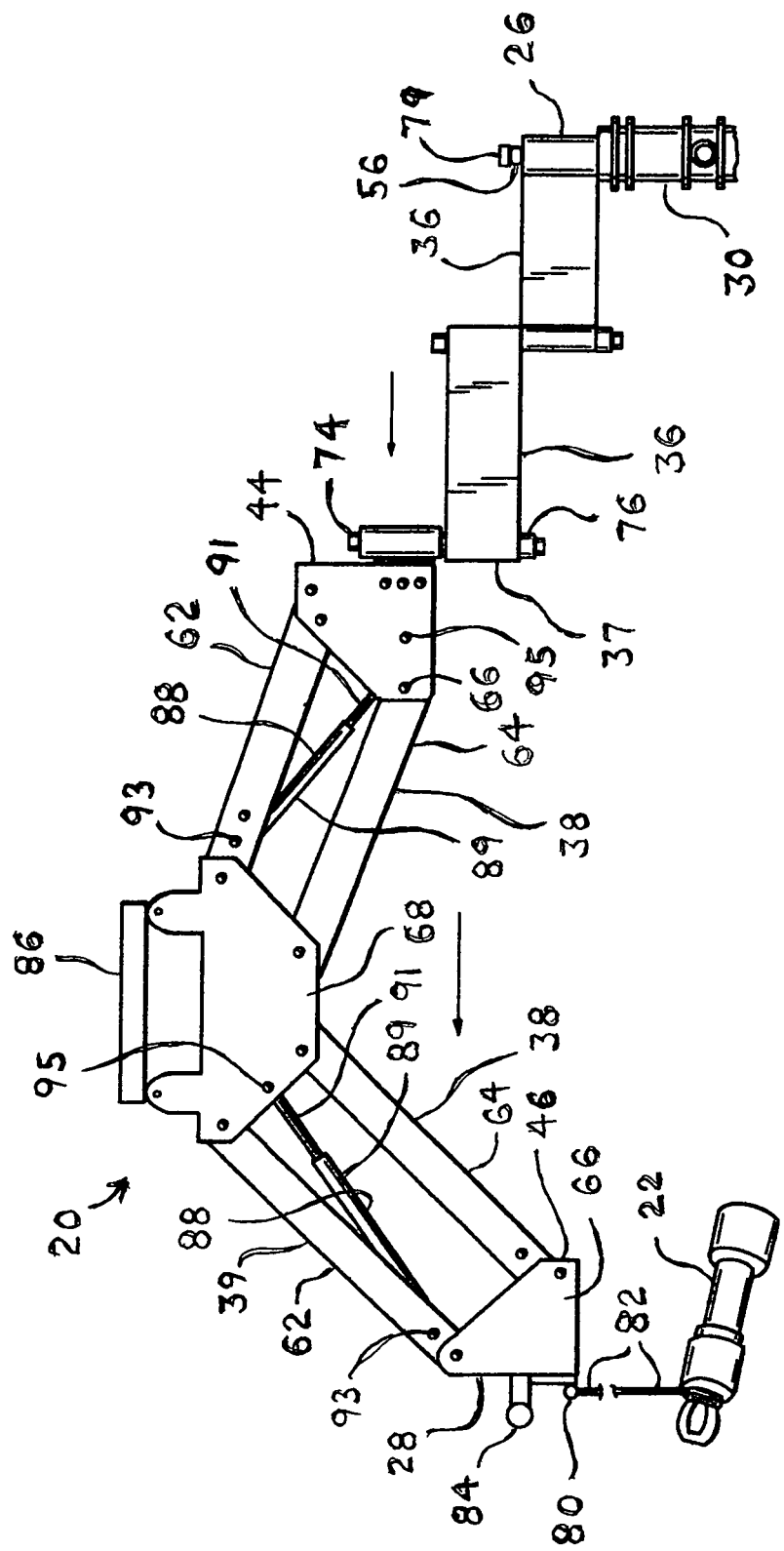
FIG. 2 is a perspective view of a fragment of the FIG. 1 support apparatus wherein the arrangement of linkages of the apparatus are positioned in an alternative condition.

Turning now to the drawings in greater detail and considering first FIGS. 1 and 2, there is illustrated an embodiment, generally indicated 20, of a support apparatus within which features of the invention are embodied and shown utilized for holding a relatively heavy hand-operated held tool 22 for use by an operator 24. The tool 22 of the FIG. 1 depiction is a crimping tool, but the tool could be any of a number of different classes of tools, such a drill, a hammer driver or an impact wrench, which would ordinarily be quite fatiguing for the operator 24 to use for an extended or uninterrupted periods of time because of the weightiness of the tool 22. Briefly, the support apparatus 20 includes an articulated arm unit, generally indicated 33, comprised of a series of arrangements (described herein) of linkages, namely support struts 36 and linkage assemblies 38, which provide the arm unit 33 with a distal end 28 from which a tool 22 is suspended (or upon which the tool 22 is mounted) and an opposite proximal end 26 which is anchorable to a fixed, or stationary, structure 32. In operation, the support apparatus 20 helps to support the weight of the tool 22 as the tool 22 is being used by the operator 24.

As will be apparent herein, the support apparatus 20 includes a mount 30 disposed adjacent the proximal end 26 of the articulated arm unit 33 enabling the support structure 20 to be stably secured to the fixed structure 32. Between the distal end 28 and the proximal end 26 of the articulated arm unit 33 are linkages, generally indicated 34, including a plurality of linkage assemblies 38 and a plurality of support struts 36 which are pivotally joined to one another in an end-to-end fashion in a linkage arrangement 37 and a plurality of linkage assemblies 38 which are pivotally joined in an end-to-end fashion in a linkage arrangement 39. These linkage arrangements 37 and 39 enable the distal end 28 of the arm unit 33 to be moved along any of the (FIG. 1) indicated X, Y or Z coordinate directions for use of the tool 22. It will be understood, however, that the linkages 34 of the articulated arm unit 33 can include an alternative number of struts 36 or an alternative number of linkage assemblies 38 in accordance with the broader aspects of the present invention.

Within the depicted FIG. 1 support apparatus 20, each strut 36 is elongated in shape having a hollow sleeve-like member 50 or 52 joined at each end of the strut 36. The hollow interiors of the members 50, 52 are arranged in a parallel relationship and accept the shank of a headed pin 54 directed thereto. By positioning the sleeve-like member 50 of one end of a shank 36 about an upwardly-directed (externally-threaded) pin 56 associated with the mount 30 (and then threadably securing a nut 79 about the pin 56) and subsequently securing adjacent ends of the two struts 36 in the manner depicted in FIG. 1 so that the hollow interior of the adjacent ends of the struts 36 are axially aligned, the shank of the headed pin 54 can be directed shank-end first through the aligned hollow interiors of the sleeve-like members 50, 52 to pin the struts 36 together. A nut 77 is threadably secured about the shank end of the headed pin 54 to retain the pin 54 through the sleeve-like members 50, 52 through which the pin 54 extends. With the elongated assembly of struts 36 thus pivotally connected to one another and to the mount 30 so the strut end, indicated 60, disposed opposite the mount 30 is free to be moved in any direction within the indicated X-Z plane.

With reference still to FIGS. 1 and 2, each linkage assembly 38 includes a pair of arms 62, 64 which are pivotally connected at the ends thereto by way of sets of plates 66, 67 or 68 mounted to the sides thereto. In operation, the linkage assemblies 38 can be pivotally moved relative to one another (and to the strut end 60) as the arms 62, 64 act as parallel linkage assemblies wherein the arms 62, 64 are continually maintained in substantially parallel relationship with one another. For pivotally connecting the linkage assemblies 38 to the strut end 60, a sleeve-like member 70 having a hollow interior is fixedly secured to one set of the plates 67 and arranged so that the hollow interior of the sleeve-like member 70 is axially aligned with the hollow interior of the sleeve-like member 52 disposed at the strut end 60. The shank of a headed pin 74 is then directed through the aligned hollow interiors of the sleeve-like members 52 and 70 to pivotally secure the arrangement 39 of linkage assemblies 38 to the strut end 60. A nut 76 can be threadably secured about the shank end of the headed pin 74 to retain the pin 74 through the aligned hollow interior of the sleeve-like members 70, 52 through which the pin 74 extends.

Meanwhile, the linkage assemblies 38 are joined in an end-to-end fashion by way of the pair of plates 68 which permit the opposite ends, indicated 44 and 46, of the arrangement 39 of linkage assemblies 38 to be moved toward and away from one (such as in the direction of the FIG. 1 arrow 41) between folded and unfolded conditions as each linkage assembly 38 is permitted to pivot about a corresponding section, or end, of the plates 68 to which the assembly 38 is pivotally connected. It will be understood that although the opposite ends 44 and 46 and the linkage assembly arrangement 37 are confined to movement within a single plane between, for example, the position shown in FIG. 1 and the position shown in FIG. 2, the permitted pivoting of the arrangement 39 of linkage assemblies 38 relative to the arrangement 37 of struts 36 by way of the pin 74 (such as in the rotational direction indicated by the FIG. 1 arrow 43), the end 46 of the linkage assembly arrangement 39 is permitted to freely be moved to any X-Y-Z coordinate position within a broad range of coordinate positions.

With reference still to FIGS. 1 and 2, there is associated with the pair of plates 66 disposed at the distal end 28 of the articulated arm unit 33 a head 78 (in the form of a rod-like member 80 to which the tool 22 can be suspended, such as with a strap 82, and there is provided a handle 84 with which the distal end 28 of the arm unit 33 can be maneuvered by the operator 24. Furthermore and for manually transporting the support apparatus 20 between job sites, there is associated with the pair of plates 68 a handle 86.

Each linkage assembly 38 also includes a gas spring 88 whose ends are connected between an arm 62 or 64 of the assembly 38 and an appropriate end of the linkage assembly 38 for retarding, or dampening, the movement of the arms 62 and 64 relative to one another and thus retarding or dampening the movement of the linkage assemblies 38 relative to one another. Such gas springs 88 have a construction which is known in the art and a counterbalancing purpose which is also known in the art so when mounted in the linkage assemblies 38, the support apparatus 20 helps to support the weight of the tool 22 suspended at the distal end 28 of the articulated arm unit 33. At the same time, however, the distal end 28 can be moved by an operator 22 (by way of the handle 84) to position the distal end 28 of the arm unit 33 at a desired location along the indicated X, Y and Z coordinate axes with relative ease.

As best shown in FIG. 2, each gas spring 88 includes a gas-filled cylinder 89 and a ram 91 which is slidably movable within and along the length of the cylinder 89. Within each of the depicted linkage assemblies 38, the gas spring 88 is pivotally connected at its cylinder end to an arm 62 with a bolt 93 and is pivotally connected at its ram end to the plates 68 or 66 with a bolt 95.

It is a feature of the support apparatus 20 that its arrangement 37 of struts 36 and the arrangement 39 of linkage assemblies 38 can be locked in position to thereby fix the X, Y and Z coordinate location at which the distal end 28 (and thus the suspended tool 22) is located. As far as the arrangement 37 of struts 36 is concerned, these can be fixed in a stationary condition by tightening the nuts 76, 77, 79 about the pins 74, 54, 56 to a snug condition thereabout, and as far as the arrangement 39 of linkage assemblies 38 is concerned, these can be fixed in a stationary condition at the gas springs 88 by locking the position of the rams 91 of the springs 88 along the length of the spring cylinders 89 in a manner known in the art. Such a locking of the position of each ram 41 along the length of a corresponding cylinder 89 can, for example, be effected by preventing the flow of gas between internal chambers of the cylinder 84.

It will be understood that although each spring 88 of the depicted support apparatus 20 is a gas spring, the spring 88 could take alternative forms, such as a hydraulic spring, an air spring or a mechanical spring which is capable of off-setting or counterbalancing the weight of the tool 22 suspended from the head 78. Accordingly, the principles of the present invention can be variously applied.

Figure 3:
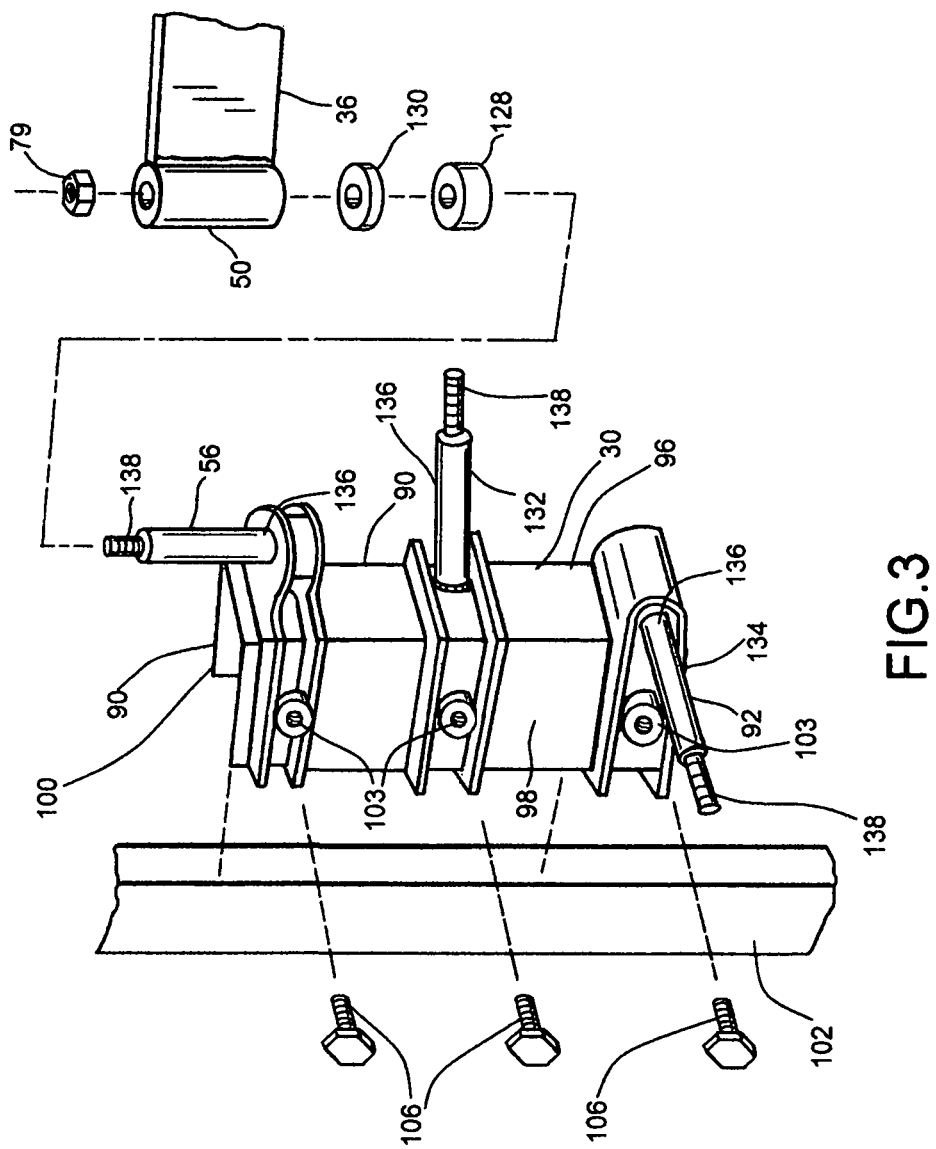
FIG. 3 is a perspective view of a mount with which the linkage assemblies of the FIG. 1 support apparatus is anchored to the vertically-oriented stationary structure of FIG. 1.
Figure 4:
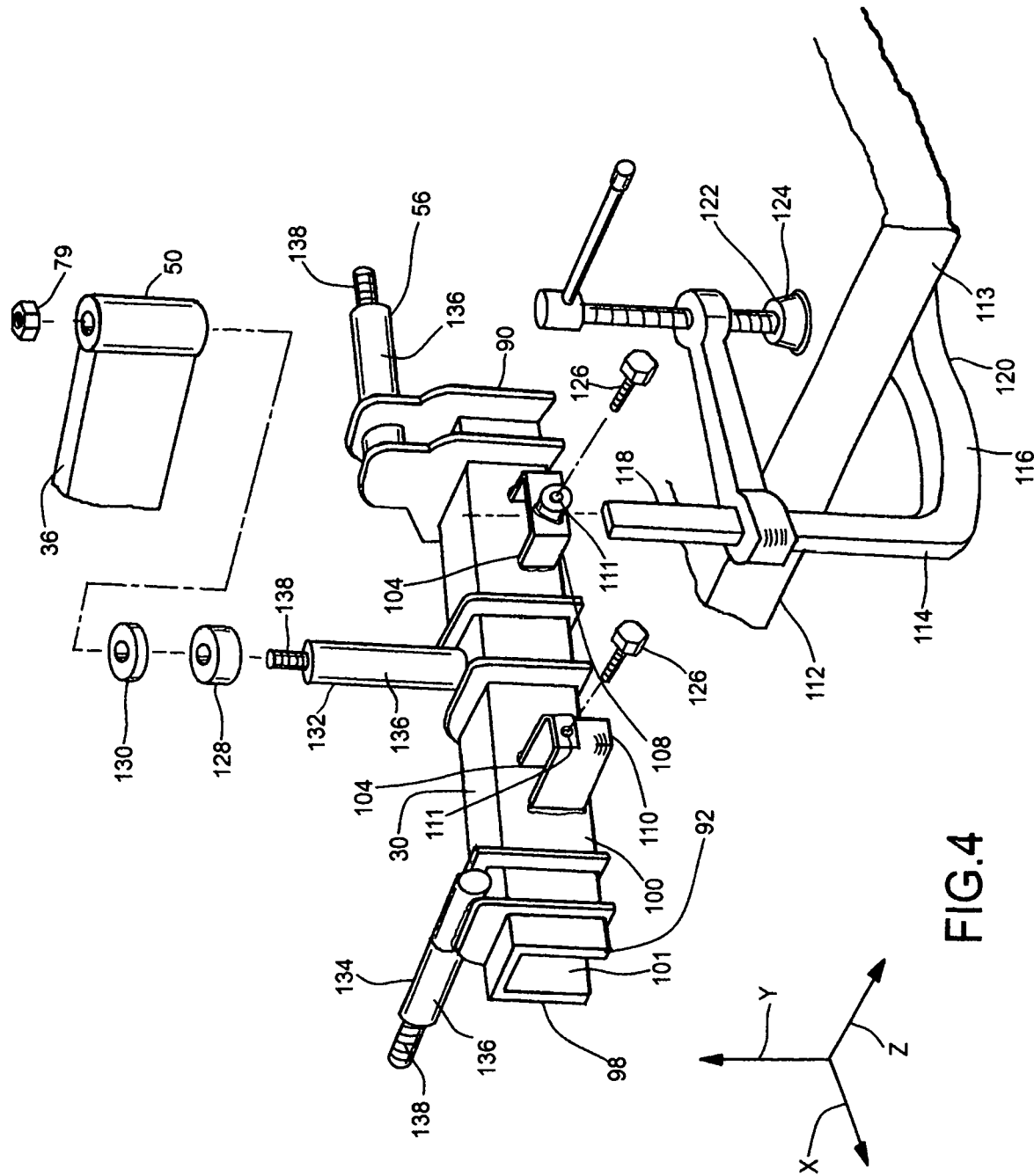
FIG. 4 is a view of the mount of FIG. 3 shown utilized for anchoring the FIG. 1 support apparatus to a worktable.

With reference to FIGS. 3 and 4, it is a feature of the support apparatus 20 that its mount 30 is capable of being attached to any of a number of fixed, or stationary, structures for purposes of anchoring the support apparatus 20 to the fixed structure and enables the articulated arm unit 33 to be joined thereto for pivotal movement about any of a number of (e.g. three) pivotal axes which correspond, for example, to paths oriented substantially parallel to the indicated X, Y and Z coordinate axes or, in other words, along an axis of a spatial arrangement including three (i.e. X, Y and Z) coordinate axes. In this connection, the mount 30 includes a major channel-shaped body, or member, 90 having two opposite ends 92, 94 and a substantially U-shaped cross section. In this connection, the body 90 includes a base portion 96 and two leg portions 98 and 100 which are joined to and extend from the base portion 96 to form the U shape of the U-shaped cross section of the body 90. As best shown in FIG. 3, the U of the body 90 provides an opening 101 which is adapted to accept a linear support item, such as a beam 102 of FIG. 3 or other fixed structure, about which the opening 101 of the U of the body 90 is positionable. Internally-threaded bosses 103 are joined to a leg portion 98 of the body 90 about pre-formed openings provided in the leg portion 98 for accepting the shanks of bolts 106 threaded therein. When the body 90 is positioned about an item, such as the beam 102, the bolts 106 can be tightened against the FIG. 3 beam 102 through the bosses 102 (and thus act as set screws) to releasably secure the body 90 to the beam 102.

With reference to FIG. 4, the mount 30 also includes a pair of side brackets 108 and 110 which are secured (e.g. welded) to the exterior surface of the leg portion 100 of the body 90 to provide passageways 104 which permit the mount 30 to be securely affixed to alternative items, such as the edge 112 of a workbench 113, by way of a J-clamp 114. To this end and as exemplified by the J-clamp 114 of FIG. 14, common J-clamps include a J-shaped frame 116 having an arm section 118 and a first jaw section 120, and a second jaw section 122 is provided by a swivel shoe 124 which can be threadably moved toward the first jaw section 120 for clamping an item, such as the edge 112 of the workbench 114, between the jaw sections 120 and 122.

Within the depicted mount 30, the passageway 104 associated with one bracket 108 is sized to accept the arm section 118 of the clamp 114 directed therethrough in a preselected orientation (i.e. so that the flat side of the arm section 118 is positioned against the exterior surface of the leg portion 100 of the mount 30), and the passageway 104 of the other bracket 110 is sized to accept the arm section 118 of the clamp 114 directed therethrough in an alternative orientation (i.e. so that the flat side of the arm section 118 is oriented at substantially a right angle to the exterior surface of the leg section 100). Furthermore, each bracket 108 or 110 is provided with an internally-threaded opening 111 and a bolt 126 which can be threadeably accepted by the spring 111 and act as a set screw to secure the arm section 118 of the clamp 114 to the body 90 of the mount 30, once the arm section 118 has been directed endwise therethough. It follows that by securing the clamp 114 to an item, such as the edge 112 of a workbeach 113, and then securing the body 90 of the mount 30 to the clamp 114, the body 90 (and thus the mount 30) is fixedly secured, or anchored, to the workbench 113.

With reference still to FIGS. 3 and 4, the mount 30 also includes a plurality of (i.e. three) pins, or pin sections, 56 (introduced earlier), 132 and 134 which are each joined at one end to the body 90 of the mount 30 at various locations thereon so that the free end of each pin 56, 132 and 134 is directed along a corresponding one of the (FIG. 4 indicated) X, Y and Z coordinate axes. In this connection, each pin 56, 132 or 134 includes a cylindrically-shaped base end 136 which is secured, as with welds, to the exterior surface of the base section 96 of the body 90 of the mount 30 and includes a threaded end 138 of reduced diameter which is sized to accept the nut 79 (introduced earlier) threaded thereon. By directing the sleeve-like member 50 of a strut 36 about a selected one of the pins 56, 132 and 134 so that the sleeve-like member 50 is positioned about the base end 136 of the pin 56, 132 or 134 (after first positioning a bearing 128 and washer 130 about the base 136 of the selected pin 56, 132 or 134) and then threadably securing the nut 79 about the threaded end 138 of the pin 56, 132 or 134, the strut 36—and any linkage assembly 38 of the support apparatus 20 connected thereof, is in a condition to be moved through a corresponding coordinate plane.

Figure 5:
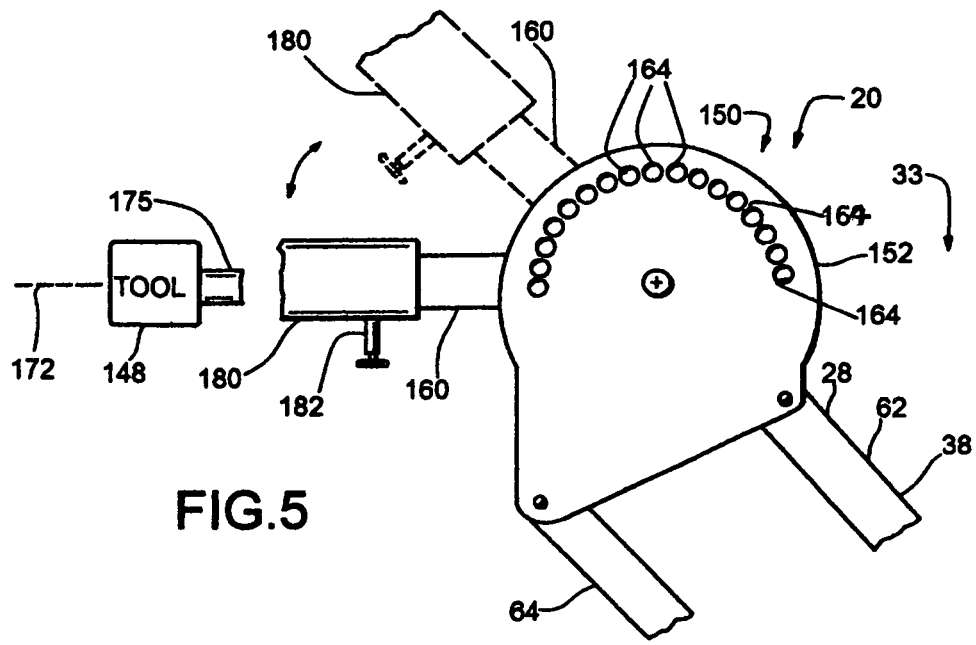
FIG. 5 is a side view illustrating schematically a tool-supporting head of a support apparatus embodying features of the present invention and to which a hand held tool can be attached for use of the tool.
Figure 6:
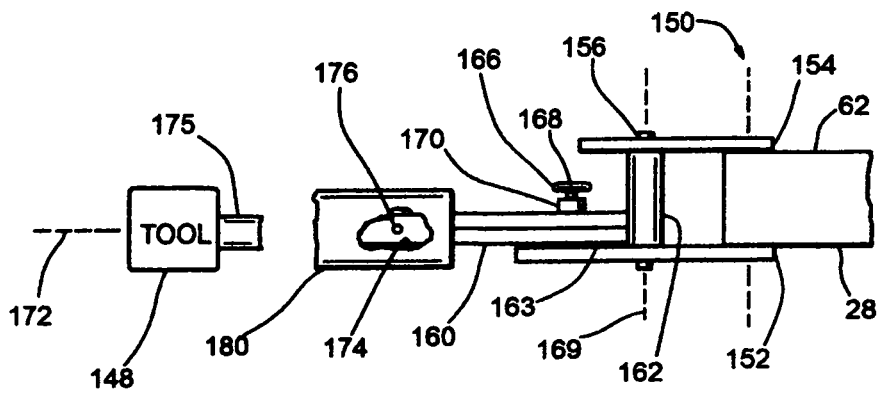
FIG. 6 is a top view of the FIG. 5 head as seen generally from above in FIG. 5, shown partially cut-away.

With reference to FIGS. 5 and 6, there is depicted an example of a head, generally indicated 150, which is capable of being mounted at the distal end 28 of the articulated arm unit 33 of the support apparatus 20 of FIGS. 1-4 to facilitate the mounting of a tool 148, such a drill, thereto. Within the depicted embodiment 150 of FIGS. 5 and 6, there is provided a pair of plates 152 and 154 which are arranged in a substantially parallel relationship with one another and which are capable of being joined to the ends of the arms 62, 64 of one of the linkage assemblies 38. That is to say, that the plates 152, 154 can replace the set of FIG. 1 plates 66 disposed adjacent the distal end 28 of the FIG. 1 support apparatus 20. Through the center of the plates 152, 154, there is directed the shank of a bolt or pivot pin 156, and an arm assembly 160 having a sleeve portion 162 at one end, indicated 163 in FIG. 6, is positioned about the pivot pin 156 to enable the arm assembly 160 to be pivoted about the pivot pin 156 between, for example, the position depicted in solid lines in FIG. 5 and the position depicted in phantom in FIG. 5.

As best shown in FIG. 6 and in order to permit the arm assembly 160 to be secured, or fixed, in a predetermined angular orientation with respect to the set of plates 152, 154 (and about the pivot pin 156), one plate 152 defines a plurality of openings 164 defined along the (near-circular) outer periphery of the plate 152, and there is associated with the arm assembly 160 a spring-biased push pin assembly 166 having a pin 168 for pinning the arm assembly 160 at a predetermined, or desired, angular orientation (i.e. about the pivot axis 169) with respect to the plates 152, 154 by way of an opening 164. In this connection, the push pin assembly 166 includes a housing 170 which is fixedly secured adjacent the sleeve portion 162, and the pin 168 (which is spring-biased to an extended condition) is mounted within the housing 170. By withdrawing the pin 168 from one opening 160, pivoting the arm assembly 160 about the pivot pin 156 and then releasing the pin 168 so that the pin 168 is thereby accepted by an alternative opening 160 along the plate 152, the arm assembly 160 (and any tool 148 supported thereby) is arranged at an alternative angular relationship (i.e. about the pivot pin 156) with respect to the linkage assembly 38.

Another feature of the head 150 of FIGS. 5 and 6 is that the head 150 is capable of supporting the tool 148 for permitted rotation of the tool 148 about the longitudinal axis, indicated 172, of the arm assembly 160. To this end, there is positioned a cylindrical (or near-cylindrical) member 174 which is axially joined to the arm assembly 160, and there are defined a plurality of pin-accepting recesses 176 (only one shown in FIG. 6) which are regularly spaced about the cylindrical periphery of the member 174. An outer shaft 180 is mounted upon the member 174 for rotational movement thereabout, and a push pin assembly 182 (FIG. 5) is mounted upon the outer shaft 180 for cooperating with the recesses 176 to releasably secure the tool 148 (which is rigidly mounted at the end of a shaft member 175 joined in-line with the outer shaft 180) in a desired rotational orientation about the member 174. Therefore and in addition to the capacity of the tool 148 to be moved to any location along the (FIG. 1) indicated X, Y and Z coordinate axes by way of the linkage assemblies 38 and struts 36 of the linkages 34 of the support assembly 20, the outer shaft 180 permits the rotational orientation of the tool 148 (about the axis 172) to be altered at that location.

Figure 7:
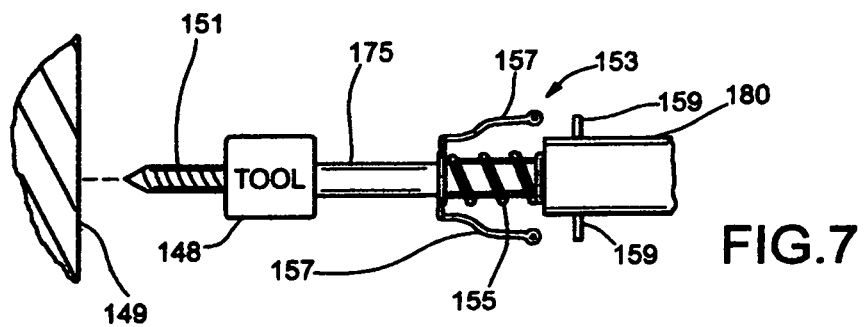
FIG. 7 is another side view illustrating schematically an alternative tool-supporting head of a support apparatus of the present invention and to which a hand-operated tool can be attached for use of the tool.

With reference to FIG. 7, still another feature of the head 150 relates to the capacity of the tool 148 to be moved axially along the length of the arm assembly 160 and to be pre-loaded with a sufficient force to permit the tool 148 to be moved into working (e.g. drilling) relationship with a surface 149 to be worked upon with the tool 148. For example and in the instance that the tool 148 of FIGS. 5-7 is a power drill having a bit 151 extending axially therefrom, such a pre-loading feature can be had by way of a spring arrangement, generally indicated 153 in FIG. 7 and having a compression spring 155 for acting between the shaft member 175 and the shaft 180, associated with the shaft member 175 upon with the tool 148 is mounted. By urging the tool 148 and member 175 axially toward the outer shaft 180 and against the force of the spring 155, the tool 148 can be releasably secured in a retracted, or pre-loaded, condition by looping the ends of cords 157 associated with the member 175 about bosses 159 associated with the shaft 180.

By thereafter positioning the bit 151 of the drill against the surface 149 through which a hole is desired to be cut (i.e. drilled) and then releasing the cords 157 from the bosses 159, the spring 155 is permitted to act continuously upon the tool 148 to drive the bit 151 against and into the surface 149. It will be understood that the forces which oppose the movement of the tool 148 into the surface 149 are, in turn, opposed, or backed, by the various components (i.e. the linkage assemblies 38 and struts 36) of the support apparatus 20 which are locked in position. In other words and while the arrangement 37 of struts 36 and the arrangement 39 of linkage assemblies 38 of the support apparatus 20 permit the tool 148 to be moved into a desired position for working upon (e.g. drilling into) the surface 149, these same components are thereafter be locked into a stationary, or rigid, condition for opposing any backdriving forces which are exerted upon the tool 148 during operation.

It will be understood that numerous modifications and substitutions can be had to the aforedescribed embodiments without departing from the spirit of the invention. For example, a support apparatus in accordance with the present invention can be provided with a mounting arrangement which enables the support apparatus to be mounted upon various support structures, such as upon a man-lift or a ladder, for use of a tool mounted to the distal end of the support apparatus. Moreover, such a support apparatus crane can be constructed, for example, of non-conducting materials (such as a relatively hard plastic) to render the support apparatus incapable of conducting an electrical current, thus increasing the safety with which the support apparatus can be utilized around electrical (or current-carrying) wires or cables.

Further still and with reference to FIGS. 8 and 9, there is depicted the support apparatus 20 of FIGS. 1-4 shown being supported upon a portable stand, generally indicated 400, capable of being wheeled into place adjacent a site to be worked upon with the support apparatus 20 (and a tool attached thereto). The stand 400 includes a base 402 including a platform assembly 404 to which a post 405 is attached so as to extend upwardly from the platform assembly 404. It is to the upwardly-extending post 405 that the support assembly 20 is connected by way of the mount 30 thereof. Within the depicted example of FIGS. 8 and 9, the elongated U-shaped body of the mount 30 is secured about the post 405 in substantially a vertical orientation.

For purposing of securing the stand 400 in a stable or rigid condition upon an underlying floor, the platform assembly 404 embodies a vacuum system, generally indicated 406, which is capable of releasably securing the platform assembly 404 in a sealed condition against a relatively smooth underlying (e.g. concrete) floor. To this end, the platform assembly 404 includes a relatively smooth bottom surface 408 bordered by a vacuum seal 409 which extends along the outer lip thereof. In addition, a vacuum pump 410 is mounted atop the platform assembly 404 and is in communication with the region disposed between the bottom surface 408 and the floor by way of an opening 412 provided in the bottom surface 408. By placing the platform assembly 404 flat against the underlying floor and energizing the vacuum pump 410, air is drawn from the region disposed between the bottom surface 408 and the floor so that the platform assembly 404 is pulled downwardly against the floor by the resultant vacuum generated beneath the bottom surface 408.

If desired, the capacity of the platform assembly 404 to be held in a stable condition upon the floor can be enhanced by placing weights 414 atop the platform assembly 404. In addition and to facilitate the movement of the stand 400 across a floor, two caster-style wheels 416 can be mounted along one edge of the platform assembly 404.

Accordingly, the aforedescribed embodiments are intended for the purpose of illustration and not as limitation.

The invention claimed is:

1. A support apparatus anchorable to a fixed structure for aiding in the support of a hand-operated tool during use of the tool, the apparatus comprising:
    an articulated arm unit including a plurality of linkages which are pivotally connected to one another in a end-to-end arrangement so as to provide the articulated arm unit with a distal end to which a tool is connected for support thereby and an opposite proximal end wherein the arm unit includes counterbalancing means associated with at least one of the linkages of the arm unit so that pivotal movement of the distal end of the arm unit relative to the proximal end thereof is effected with relative ease, and
    a mount associated with the proximal end of the arm unit and including a body which is capable of being secured to a fixed structure for anchoring the support apparatus to the fixed structure, the mounting means further including two pins which are joined to and extend from the body of the mount and which are oriented in a substantially normal relationship with one another; and wherein the proximal end of the arm unit is capable of being pivotally joined to either of the two pins of the body of the mount so that upon anchoring the body of the mount to a fixed structure and by pivotally joining the proximal end of the articulated arm unit to one or the other of the two pins of the mount, the articulated arm unit is capable of being pivoted relative to the fixed structure about a first axis or a second axis wherein the first and second axes are arranged in a substantially normal relationship;

wherein there is associated with the proximal end of the arm unit a member which includes a sleeve portion which can be positioned about either one or the other of the two pins for pivotal movement with respect thereto; and wherein the mount further includes a third pin which is joined to and extends away from the body of the mount and which is oriented in a substantially normal relationship with each of the one and the other of the two pins so that upon anchoring the body of the mount to a fixed structure and by pivoting the proximal end of the articulated arm unit to the third pin, the articulated arm unit is capable of being pivoted relative to the support structure about a third axis wherein the third axis is arranged in a substantially normal relationship to each of the first or second axes.

2. The support structure as defined in claim 1 wherein the body of the mount is substantially U-shaped in cross section wherein the opening of the U of the U-shape can be directed about the fixed structure for securement thereto.

3. The support apparatus as defined in claim 2 wherein the U-shape of the body of the mount has two leg portions joined by a base portion and one of the leg portions is provided with a threaded opening therein, and the mount further includes a fastener having a threaded shank which is threadably accepted by the threaded opening provided in the one leg portion of the mount for acting as a set screw for securing the U-shaped body of the mount about the fixed structure.

4. The support apparatus as defined in claim 1 wherein the mount further includes a U-shaped bracket having two leg sections and a base section which is joined between the leg sections, and wherein the U-shaped bracket is joined to the body of the mount by way of the leg sections for providing, with the body of the mount, a passageway which is positionable about the fixed structure, and the mount further includes means for clamping the U-shaped bracket about the fixed structure.

5. The support apparatus as defined in claim 4 wherein one of the leg sections and the base section defines an internally-threaded opening, and the means for clamping includes a fastener having a threaded shank which is threadably accepted by the internally-threaded opening provided in the one of the leg sections and the base section for acting as a set screw for securing the U-shaped bracket of the mount about the fixed structure.

6. The support apparatus as defined in claim 1 wherein the linkages of the articulated arm unit include two struts which are pivotally joined to one another in an end-to-end arrangement within the articulated arm unit.

7. The support apparatus as defined in claim 1 wherein the linkages of the articulated arm unit further includes two linkage assemblies which are connected to one another in an end-to-end arrangement for movement relative to one another between folded and unfolded conditions, and wherein each of the linkage assemblies includes a pair of arms which are maintained in a substantially parallel relationship with one another as the linkage assemblies are moved between the folded and unfolded conditions.

8. The support apparatus as defined in claim 7 wherein the linkages of the articulated arm unit include two struts which are pivotally joined to one another in an end-to-end arrangement within the articulated arm unit and which are pivotally connected in a series relationship with the two linkage assemblies so that one of the two struts provides the proximal end of the articulated arm unit and one of the linkage assemblies provides the distal end of the articulated arm unit.

9. The support apparatus as defined in claim 1 further including a tool-supporting head mounted adjacent the distal end of the articulated arm unit to which a tool can be fixedly secured, and the tool-supporting head accommodates an adjustment in the orientation of the tool relative to the articulated arm unit about an axis.

10. The support apparatus as defined in claim 1 further comprising a tool-supporting head mounted adjacent the distal end of the articulated arm unit to which a tool can be fixedly secured, and the support apparatus further includes means for biasing the tool into working relationship with a surface desired to be worked upon with the tool.

11. The support apparatus as defined in claim 1 in combination with a portable stand to which the mount of the support apparatus can be fixedly secured, and the portable stand includes a platform assembly capable of being releasably secured to an underlying floor by a generated vacuum.

12. A support apparatus which is securable to a fixed structure for aiding in the support of a hand-operated tool during use of the tool, the apparatus comprising:

an articulated arm unit having a proximal end which is anchorable to the fixed structure and an opposite distal end to which a hand-operated tool can be secured for use, and the articulated arm unit including at least two linkages which are pivotally joined together in an end-to-end arrangement for movement relative to one another between folded and unfolded conditions, and wherein each of the two linkages includes a pair of arm sections which are maintained in substantially parallel relationship with one another as the linkages are moved between the folded and unfolded conditions;

the articulated arm unit includes counterbalancing means associated with the linkage assemblies so that pivotal movement of the distal end of the arm unit relative to the proximal end thereof is effected with relative ease; and a mount associated with the proximal end of the arm unit and including a body which is capable of being secured to a fixed structure for anchoring the support apparatus to the fixed structure, the mounting means further including three pins which are joined to and extend from the body of the mount so that each pin is arranged along a corresponding axis of a spatial arrangement including three coordinate axes; and wherein the proximal end of the arm unit is capable of being pivotally joined to any of the three pins of the body of the mount so that upon anchoring the body of the mount to a fixed structure, the proximal end of the articulated arm unit can be pivotally connected to any one of the three pins of the mount to permit the articulated arm unit to pivot relative to the mount about any one selected axis in a spatial arrangement including three coordinate axes.

13. The support apparatus as defined in claim 12 wherein there is associated with the articulated arm unit a member which includes a sleeve portion which can be positioned about any of the three pins to accommodate pivotal movement of the articulated arm unit relative to the mount.

14. The support structure as defined in claim 12 wherein the body of the mount is substantially U-shaped in cross section wherein the opening of the U of the U-shape can be directed about the fixed structure for securemnt thereto.

15. The support apparatus as defined in claim 14 wherein the U-shape of the body of the mount has two leg portions joined by a base portion and one of the leg portions is provided with a threaded opening therein, and the mount further includes a fastener having a threaded shank which is threadably accepted by the threaded opening provided in the one leg portion of the mount for acting as a set screw for securing the U-shaped body of the mount about the fixed structure.

16. The support apparatus as defined in claim 12 wherein the mount further includes a U-shaped bracket having two leg sections and a base section which is joined between the leg sections, and wherein the U-shaped bracket is joined to the body of the mount by way of the leg sections for providing, with the body of the mount, a passageway which is positionable about the fixed structure, and means for clamping the U-shaped bracket about the fixed structure, and
    wherein one of the leg sections and the base section of the U-shaped bracket defines an internally-threaded opening, and the means for clamping includes a fastener having a threaded shank which is threadably accepted by the internally-threaded opening provided in the one of the leg sections and the base section for acting as a set screw for securing the U-shaped bracket of the mount about the fixed structure.

17. The support apparatus as defined in claim 12 further including a tool-supporting head mounted adjacent the distal end of the articulated arm unit to which a tool can be fixedly secured, and the tool-supporting head accommodates an adjustment in the orientation of the tool relative to the articulated arm unit about an axis.

18. The support apparatus as defined in claim 12 further comprising a tool-supporting head mounted adjacent the distal end of the articulated arm unit to which a tool can be fixedly secured, and the support apparatus further includes means for biasing the tool into working relationship with a surface desired to be worked upon with the tool.

19. A support apparatus anchorable to a fixed structure for aiding in the support of a hand-operated tool during use of the tool, the apparatus comprising:
    an articulated arm unit including a plurality of linkages which are pivotally connected to one another in a end-to-end arrangement so as to provide the articulated arm unit with a distal end to which a tool is connected for support thereby and an opposite proximal end wherein the arm unit includes counterbalancing means associated with at least one of the linkages of the arm unit so that pivotal movement of the distal end of the arm unit relative to the proximal end thereof is effected with relative ease, and
    a mount associated with the proximal end of the arm unit and including a body which is capable of being secured to a fixed structure for anchoring the support apparatus to the fixed structure, the mounting means further including two pins which are joined to and extend from the body of the mount and which are oriented in a substantially normal relationship with one another; and
    wherein the proximal end of the arm unit is capable of being pivotally joined to either of the two pins of the body of the mount so that upon anchoring the body of the mount to a fixed structure and by pivotally joining the proximal end of the articulated arm unit to one or the other of the two pins of the mount, the articulated arm unit is capable of being pivoted relative to the fixed structure about a first axis or a second axis wherein the first and second axes are arranged in a substantially normal relationship; and
    wherein the plurality of linkages includes a pair of linkage assemblies which are pivotally connected together in an end-to-end relationship and wherein each linkage assembly of the pair of linkage assemblies includes a pair of arms which are substantially arranged in a plane and are joined to the pair of arms of the other linkage assembly of the pair of linkage assemblies so that when the pair of linkage assemblies are pivotally moved relative to one another, the pair of arms of each linkage assembly are maintained in a substantially parallel relationship with one another and the arms of the pair of linkage assemblies are confined to movement within a single common plane.

\* \* \* \* \*